United States Patent [19]

Barcy

[11] Patent Number: 4,512,322
[45] Date of Patent: Apr. 23, 1985

[54] ENGINE PREHEATERS

[75] Inventor: Michael F. Barcy, Tadworth, England

[73] Assignee: CT Harwood Limited, London, England

[21] Appl. No.: 397,069

[22] Filed: Jul. 12, 1982

[51] Int. Cl.³ ............................................. F02M 31/00
[52] U.S. Cl. ....................................... 123/549; 123/556; 123/546; 261/142; 219/206
[58] Field of Search ............... 123/549, 546, 552, 556; 261/142; 219/205, 206, 207

[56] References Cited

U.S. PATENT DOCUMENTS

| 990,249 | 4/1911 | Garcia | 261/142 |
|---|---|---|---|
| 1,135,195 | 4/1915 | Krause | 123/549 |
| 1,139,845 | 4/1915 | Tate | 123/549 |
| 1,246,820 | 11/1917 | Milligan | 219/207 |
| 1,281,139 | 10/1918 | Colvin | 219/207 |
| 1,293,718 | 2/1919 | Corny | 219/207 |
| 1,352,049 | 9/1920 | Cass | 261/142 |
| 1,361,095 | 12/1920 | Perrine | 219/207 |
| 1,493,400 | 5/1924 | Starbuck | 123/549 |
| 2,139,777 | 12/1938 | Skok | 123/549 |
| 2,700,722 | 1/1955 | Gurley | 219/206 |
| 2,705,941 | 4/1955 | Unschuld | 219/206 |
| 2,719,520 | 10/1955 | Balzer | 123/549 |
| 2,873,349 | 2/1959 | Clark | 219/206 |
| 4,116,183 | 9/1978 | Hayward | 123/549 |

FOREIGN PATENT DOCUMENTS

| 648135 | 2/1928 | France | 123/549 |
|---|---|---|---|
| 281244 | 2/1952 | Switzerland | 123/549 |
| 340666 | 10/1959 | Switzerland | 123/549 |

*Primary Examiner*—Ronald H. Lazarus
*Attorney, Agent, or Firm*—Hopgood, Calimafde, Kalil, Blaustein & Judlowe

[57] ABSTRACT

An air heating device for the inlet air flow to an air-breathing internal combustion engine comprises a helically coiled electrical resistance in the air entry conduit and a rigid retaining member passing through the coils of resistance along its length. The member is securely fixed at both ends to opposite sides of the conduit structure and is spaced from the coils of the resistance so that these are fully exposed to the air flow. In the event of the coiled resistance breaking loose from its normal mountings the retaining member will hold it to ensure damage is not caused by the resistance reaching a combustion chamber entry. The device can be arranged as a gasket-like unit with the body a ring-like frame that is clamped between opposed flanges of adjoining parts of the engine air entry.

15 Claims, 10 Drawing Figures

ENGINE PREHEATERS

BACKGROUND OF THE INVENTION

This invention relates to heating means for the inlet air flow to an air-breathing internal combustion engine, particularly a compression ignition engine.

In the operation of internal combustion engines, it is sometimes required to preheat the inlet airflow when operating in low ambient temperatures. In compression ignition engines in particular, a low air inlet temperature can cause difficulties when starting the engine and when the engine is running at idling speeds. It is therefore known to provide an electrical preheater in the form of a resistance coil suspended in the inlet air flow path, usually as part of a screwed plug that can be fixed via a threaded boss. Typically, this will be positioned on the engine air inlet manifold, or similarly close to the cylinder inlets so that the heating energy is not dissipated before the airflow enters the engine cylinders. Such heating means are known, for example, from UK Pat. Nos. 921986 and 933331.

With these known arrangements, it is rarely if ever that the coil is inspected to ensure that it has remained securely in place. But should the coil break loose and reach the entry to a combustion chamber, it can cause catastrophic damage to the engine. The possibility of detachment, e.g. due to fatigue failure, is increased by the operating conditions: of necessity the coil is subjected to repeated heating and cooling and to vibration both due to engine vibration and to aerodynamic forces since it must be placed where it is fully exposed to the air inlet flow. If an electrical heating resistance element is to respond quickly and efficiently, it must have a relatively small cross-section so that its operation would be adversely affected by any attempt to avoid this problem by providing a substantially more robust coil construction.

Other engine inlet heating means are known in which an electrical resistance member is clamped rigidly to a firm support (UK Pat. No. 340719) or contained in a rigid outer casing (UK Pat. Nos. 150605 and 180463) but although these measures avoid the dangers mentioned in the preceding paragraphs, the heating efficiency is considerably reduced because a much larger mass must be warmed before the inlet flow experiences any heating effect. Such loss of efficiency is particularly disadvantageous if the heating means are to be used as a cold-starting aid.

It is also known to support an inlet heating coil so that the coil axis extends in the direction of the inlet flow (UK Pat. Nos. 130370, 280555, 535175 and 555115). Such an arrangement considerably reduces the aerodynamic forces on the coil and so lessens the risk of detachment, but in this case also there can be an unacceptable loss of heating efficiency, in particular because a far smaller proportion of the flow can be influenced by the heated coil. Moreover, if such a coil is to heat the inlet flow to a number of cylinders of a piston engine, the entry temperature into the individual cylinders may then be markedly non-uniform.

SUMMARY OF THE INVENTION

According to one aspect of the present invention, there is provided an air breathing internal combustion engine having heating means disposed in at least one air inlet conduit leading to the combustion space or spaces of the engine comprising transversely extending helically coiled electrical resistance element in the air path within the conduit or conduits, and a substantially rigid retaining member for said element directed through the coil interior to extend transversely between and be secured to opposed walls of said conduit being arranged to provide a support for the resistance element, the coil internal cross-section being substantially greater than the cross-section of the retaining member whereby at least a major part of the coil is held in the conduit spaced from the retaining member.

According to another aspect of the invention, there is provided an air heating device for an air-breathing internal combustion engine, comprising a rigid retaining member arranged to be secured in a part of the air inlet conduit structure of the engine by its opposite ends to extend transversely across said inlet conduit with a similarly transversely extending helical coil of bare metal providing an electrical resistance element, said coil being located with the retaining member directed through its interior so as to retain the coil against displacement, the coil internal cross-section being substantially greater than the cross-section of the retaining member whereby at least a major part of the coil is held in the conduit spaced from the retaining member.

The support means may comprise screwed plugs or other separate mounting means in opposite side walls of a region of the air path through said air inlet conduit structure. Alternatively said support means may comprise a carrier body for attachment to a part of the air inlet conduit structure and having an opening extending through it to form a part of the air inlet conduit when so attached, said carrier body having the elongate electrical resistance element mounted in said aperture and the retaining member for supporting said element extending across said aperture and being secured to opposed walls of said body.

The retaining member thus provided is able to hold the resistance element if this should break or become detached from its normal supports, and so prevent it being carried into the engine. The member can be of any convenient form to fulfil this function and preferably it projects into or through said opposed walls so that it does not rely on the strength of separate attachment elements to hold it against any forces acting in a direction of the airflow.

The retaining member may form or be part of the normal mounting of the resistance element supporting the element in its intended operational position, but the member can alternatively provide simply a back-up support to become effective only if the coil comes loose from its normal mounting.

It may be arranged that said retaining element provides an electrical connection for the resistance element, whether as a line terminal or a terminal to an earth or return path for the current through the element.

DESCRIPTION OF THE PREFERRED EMBODIMENTS

Figure 1:
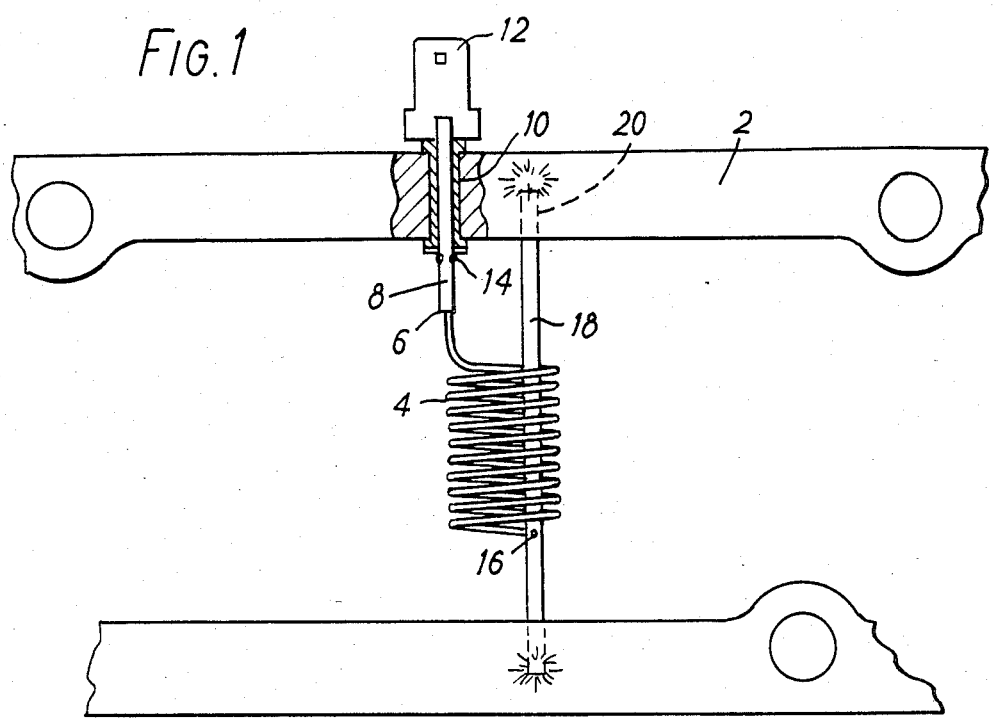
FIGS. 1 and 2 are mutually transverse views of one form of air heating device according to the invention.
Figure 2:
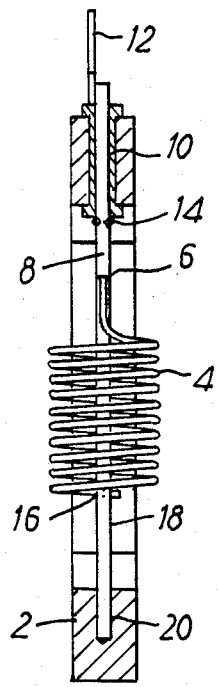

The device shown in FIGS. 1 and 2 comprises a metal plate-form body 2 that is intended to be placed over a manifold gasket of a conventional multi-cylinder compression ignition engine and, as seen in the view of FIG. 1, has a frame-like form with a similar profile to the gasket, providing an aperture corresponding to the entry face of the manifold. At intervals along the length of the plate-like body, corresponding approximately to the cylinder inlet ports positions along the length of the inlet manifold, heating coils 4, only one of which is shown, are mounted on the body 2. Each comprises a bare metal coil, one end of which has a spot-welded attachment 6 to a terminal pin 8 that projects from the body through an insulating sleeve 10 and is held in place by a spade terminal 12 on its outer end and crimping 14 on its inner end. The other end of the coil has a spot welded attachment 16 to a rigid retaining member in the form of a bar 18.

The bar 18 extends transversely across the body, being received in co-axial apertures 20 formed in the opposite side walls of the body and being secured to their side walls by welding and/or by staking of its ends so that once inserted it is permanently in place. The bar is of metal, forming the negative electrode of the coil 4 and is electrically continuous with the body 2 of the device, which is also of metal. It will be understood that, depending upon the electrical system of the engine, it may alternatively be preferred to arrange that the bar is insulated from the body, in which case the other terminal can be electrically continuous with it, or if desired both terminals may be insulated from the bar.

In use, the coil may be energised either by a separate switch, or in an automatic manner, e.g. in combination with a starter motor and/or an engine speed sensor and/or an air temperature gauge. It will be clear without further illustration to those skilled in the art how these operational modes can be realised.

It will be apparent that the bar 18 normally holds only one end of the coil, and the coil internal diameter being substantially greater than the bar cross-section the surfaces of the coil are freely exposed to the gas flow through the manifold. In normal operation there is no contact between the bar and the turns of the coil, the gap between them being greater than the anticipated vibratory movement of the coil. Nevertheless the bar is able to provide a support that will retain the coil should it become detached from either or both spot-welded attachments, or if it fractures along its length, since the bar can be made strong enough to stand any foreseen stresses. It is therefore possible to prevent any possibility of damage arising due to the coil becoming detached. Nevertheless the coil can be constructed from relatively thin wire, so that it will heat up very rapidly when the current is passed through it.

The individual coils for the different ports would normally be wired in parallel. In the event of a coil coming detached, it will either be isolated from the circuit or partially shorted on its retaining member. In the latter case, because it can be expected that there will be considerable vibration the shorting is likely to be intermittent in nature so that it will have relatively little effect on the operation of the remaining coils. The device may therefore still retain much of its effectiveness even if a coil becomes detached.

In the second form of the invention illustrated, the device is intended for an engine in which the cylinders are fed by individual conduits, or, as in the illustrated instance a pair of cylinder inlet ports is twinned to a common inlet conduit. Parts similar to those already described are indicated by the same reference numbers with the addition of the suffix "a".

In this example, two coils 4a are shown, one for each cylinder port, sharing the same bar 18a as a retaining member, but it will be understood that a single larger coil may be provided to preheat the air for both cylinders.

Figure 5:
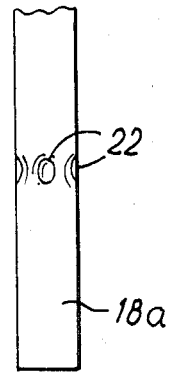
FIG. 5 illustrates a detail of the device of FIGS. 3 and 4, FIGS. 6 and 7 are mutually transverse views of a further form of air heating device according to the invention.

FIG. 5 shows in detail the staking of the rod fixed in place, this comprising a series of punched indents 22 which raise the surrounding material so that the rod ends are then held permanently within the apertures in opposite sides of the body.

Figure 3:
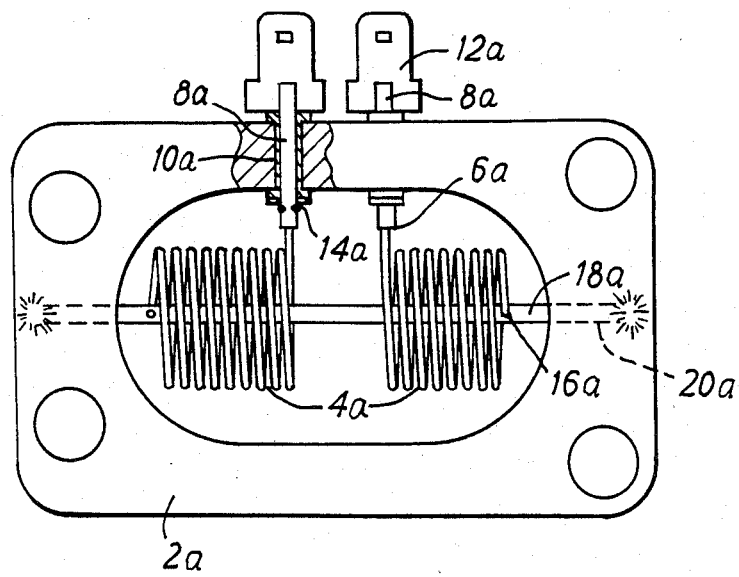
FIGS. 3 and 4 are similar views of another form of heating device according to the invention.
Figure 4:
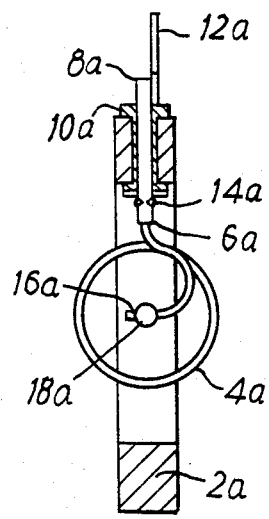
Figure 6:
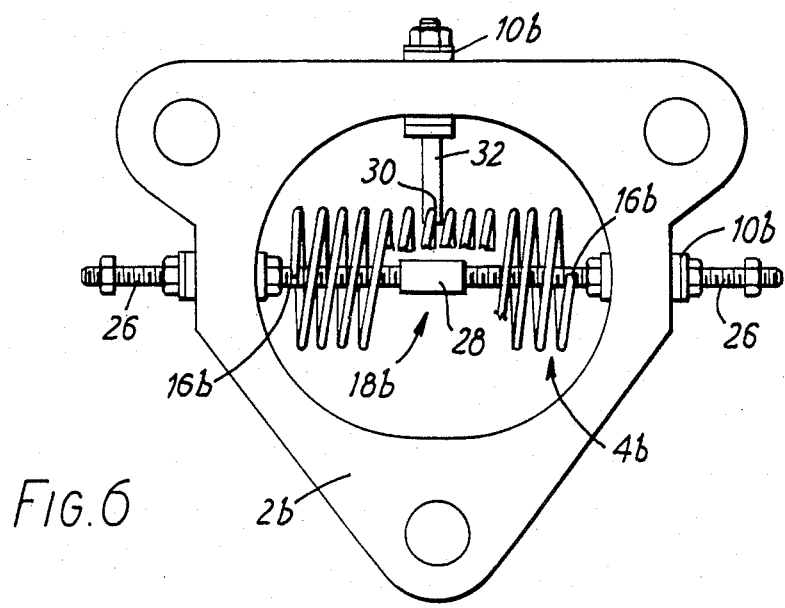
Figure 7:
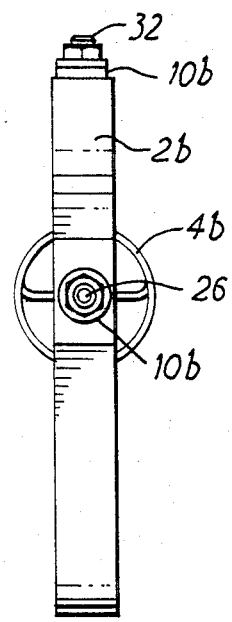

FIGS. 6 and 7 illustrate a modified form of the twinned inlet port device of FIGS. 3 to 5, and parts similar to those already described are indicated by the same references with the suffix "b".

The retaining member 18b is now a composite construction of two metal bars 26 extending coaxially from opposite sides of the plate-like body 2b to be joined by an electrically insulating spacer 28 bonded to their adjacent ends. The bars are each secured to the body through electrically insulating bushes 10b and have screwed outer ends providing electrical terminals. The bars are slidable in their bushes before they are finally secured so that the member position in the body 2b is axially adjustable. Although such adjustment will not normally be required in the completed installation, it means that the same parts can be used in a number of alternative installations having different conduit sizes. The external projection of the ends of the bars is also useful as it can indicate if the retaining member has shifted its position after an extended period of use.

The heating coil 4b is secured, by welds 16 at its opposite ends, to the respective bars, and it has an additional connection 30 at the centre of its length to a third rod 32 projecting transversely to the two rods 26 but terminating clear of them. The third rod is similarly secured through an insulating bush 10b and has a screwed terminal at its outer end.

Because of the additional support to the rod 32 intermediate its length, a larger single coil can be employed with a similar output to the two smaller coils required in the embodiment of FIGS. 3 and 4.

In use, the two rods can be connected to the line terminal of an electrical circuit and the centre rod to the earth return. The two halves of the coil 4b then function in parallel. Alternatively the two rods can be connected one to live and the other to earth so that the coils are operated in series. This choice of connections allows the arrangement to be designed for use with alternative voltage systems, e.g. with a 12 V supply in parallel and with a 24 V supply in series.

Figure 8:
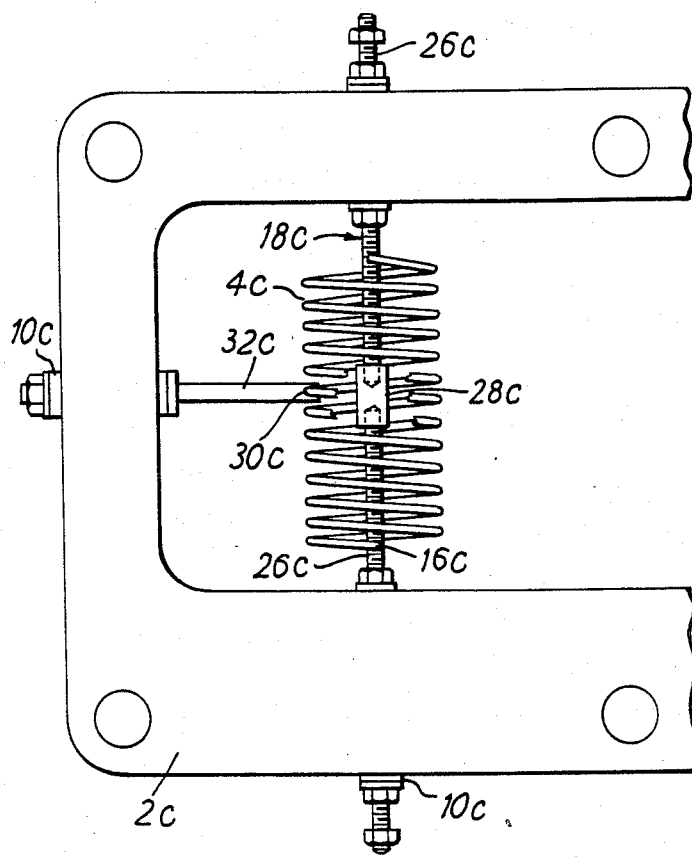
FIGS. 8 and 9, are mutually transverse views of yet another form of air heating device according to the invention.
Figure 9:
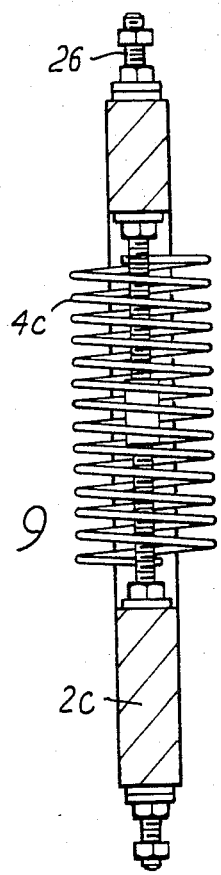

FIGS. 8 and 9 illustrate a similar arrangement of coil connections in a manifold heating device analogous to that in FIGS. 1 and 2. Similar parts to those already described are indicated by the suffix "c".

Figure 10:
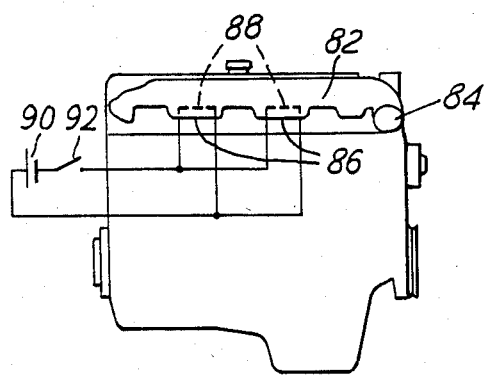
FIG. 10 is an outline illustration of an internal combustion piston engine provided with two air heating devices according to the invention.

FIG. 10 is an outline sketch of a Diesel engine provided with inlet air heaters according to the invention.

On the engine main block 80 an air inlet conduit 82 is mounted, through which air is drawn from an inlet opening 84 to outlet openings 86 for two twinned cylinder inlet ports. Inserted in the conduit 82 at or adjacent each outlet opening 86 is an air heater 88 which may take the form of any of the examples described above. The heaters are connected in parallel to an electrical power source 90 and are controlled by a manual or automatic switch 92.

Many of the features in the different embodiments described can be combined, and many other modifications are possible within the scope of the present invention. For example, when the retaining member is secured by sleeves or plugs or the like, as shown in the last two illustrated examples, these plugs may also carry one or more electrical connections insulated from the bar, so that both external terminals of the coil can then be disposed adjacent each other.

Generally it is preferred that the cross-section of the retaining member or bar, if it is used as an electrical conductor, shall be considerably larger than the cross-section of the heating coil material so that the member or bar does not itself have any significant effect as a resistive, heat-dissipating element.

It will be understood from illustrated examples that the air-heating devices can be bolt-on fixtures that are attached as self-contained units to an inlet manifold or the inlet porting, or they can be built into an engine, the or each coil and its retaining member being then mounted directly on the engine manifold or inlet pipe. In general it is desirable to mount the coil as close as possible to the cylinder inlet ports, so that this solution may be preferred, especially if the preheater is to be fitted during the manufacture of the engine.

What is claimed is:

1. In an air-breathing internal combustion engine having at least one combustion air-inlet conduit providing an air path between transversely opposed walls, the improvement consisting of an air-heating device in said conduit comprising an electrical resistance element in the form of a helical coil extending transversely across said air path and a substantially rigid electrically conductive retaining member for said element, said device including support means for mounting said retaining member, said support means comprising a one-piece carrier body attached to the air-inlet conduit and having an opening through it and between opposed body walls to form a part of the air-inlet conduit, said member being (1) connected to one end of the coil and (2) directed through the coil interior and (3) extending across said opening and (4) being secured to said opposed body walls, said member providing a support for at least said one end of the resistance element, the coil comprising a series of turns each having an internal cross-section substantially greater in all directions than the corresponding cross-section of the retaining member, the other end of said coil being adapted for support by one of said opposed body walls, the coil being suspended solely by its ends within said opening and with essentially the whole length of the coil spaced from the retaining member.

2. An air heating device for use in an air-breathing internal combustion engine having an inlet air conduit structure comprising transversely opposed walls with an inlet combustion air path between them, said device comprising a rigid retaining member and support means for mounting said retaining member, said support means comprising a one-piece carrier body adapted for attachment to the inlet air conduit structure and having an opening through it and between opposed body walls to form a part of the inlet air conduit structure, said retaining member extending across said opening and being secured to said opposed body walls, and an electrical resistance element in the form of a bare-metal helical coil extending within said opening substantially parallel with said retaining member and having the retaining member directed through the coil interior so as to retain the element against displacement, the coil comprising a series of turns having an internal cross-section substantially greater in all directions than the corresponding cross-section of the retaining member, the retaining member-cross section being substantially greater than the cross-section of the coil material, and the coil being suspended solely by its ends with essentially the whole length of the coil spaced from the retaining member.

3. In an air-breathing internal combustion engine having at least one combustion air-inlet conduit providing an air path between transversely opposed walls, the improvement consisting of an air heating device in said conduit comprising an electrical resistance element in the form of a helical coil extending transversely across said air path and a substantially rigid retaining member for said element directed through the coil interior to extend between said opposed walls, said device including support means for mounting said retaining member, said support means comprising a one-piece carrier body attached to the air-inlet conduit and having an opening through it and between opposed body walls to form a part of the air-inlet conduit, said member providing a support for the resistance element, the coil internal cross-section being substantially greater than the cross-section of the retaining member, the coil being suspended solely by its ends with essentially the whole length of coil spaced from the retaining member, and adjustable means securing the retaining member to said opposed walls in the direction of its length whereby the member is adjustably located in said direction.

4. An engine according to claim 1 wherein support means securing said retaining member comprise a plurality of separately attachable elements at respective ends of the retaining member.

5. An engine according to claim 2 wherein said elements are in the form of plugs, and openings in opposite side walls of a region of said body receive said plugs.

6. An engine according to claim 2 wherein the electrical resistance element has one end secured to said retaining member, said member being arranged to provide an electrical connection to said element.

7. In an air-breathing internal combustion engine having at least one combustion air inlet conduit providing an air path between transversely opposed walls, the improvement consisting of an air heating device in said conduit comprising an electrical resistance element in the form of a helical coil extending transversely across said air path and a substantially rigid retaining member for said element directed through the coil interior to extend between and to be secured to said opposed walls, said member providing a support for the resistance element, the coil comprising a series of turns each having an internal cross-section substantially greater in all directions than the corresponding cross-section of the retaining member whereby essentially the whole length of the coil is freely suspended in the conduit spaced from the retaining member, and a further member projecting into the air inlet conduit for providing an electrical connection for the resistance element, said further member engaging the resistance element intermediate its length to form a common terminal for respective portions of the element extending mutually oppositely from said engagement.

8. An engine according to claim 1 wherein the retaining member provides electrical connections for the opposite ends of said resistance element portions.

9. An engine according to claim 1, wherein the retaining member is electrically insulated from the biody to which it is secured.

10. An engine according to claim 1, wherein the retaining member projects through opposite portions of said body and is adjustable in the direction of its length.

11. An engine according to claim 1 wherein said electrical resistance element is one of a plurality in spaced relation with a common retaining member.

12. In an air-breathing internal combustion engine having at least one combustion air inlet conduit providing an air path between transversely opposed walls, the improvement consisting of an air heating device in said conduit comprising an electrical resistance element in the form of a helical coil extending transversely across said air path and a substantially rigid retaining member for said element directed through the coil interior to extend between and be secured to said opposed walls, said member providing a support for the resistance element, the coil internal cross-section being substantially greater than the cross-section of the retaining member whereby at least a major part of the coil is held in the conduit spaced from the retaining member, said member comprising an electrically insulating portion intermediate its length and respective electrically conductive portions separated by said insulating portion.

13. In an air-breathing internal combustion engine having at least one combustion air inlet conduit providing an air path between transversely opposed walls, the improvement consisting of an air heating device in said conduit comprising an electrical resistance element in the form of a helical coil extending transversely across said air path and a substantially rigid retaining member for said element directed through the coil interior to extend between and be secured to said opposed walls, said member providing a support for the resistance element, a further member projecting into the air inlet conduit for providing an electrical connection for the resistance element, said further member engaging the resistance element intermediate its length to form a common terminal for respective portions of the element extending mutually oppositely from said engagement, the coil internal cross-section being substantially greater than the cross-section of the retaining member whereby essentially the whole length of each said portion of the resistance element is held in the conduit spaced from the retaining member.

14. The improvement of claim 12, wherein support means are provided on which said retaining member is mounted, said support means comprising a carrier body adapted for attachment to the air inlet conduit and having an opening extending through it and between opposed body walls to form a part of the air inlet conduit, said carrier body having the electrical resistance element mounted within said opening, and the retaining member extending across said opening and being secured to opposed walls of said body.

15. The improvement of claim 13, wherein support means are provided on which said retaining member is mounted, said support means comprising a carrier body adapted for attachment to the air inlet conduit and having an opening extending through it and between opposed body walls to form a part of the air inlet conduit, said carrier body having the electrical resistance element mounted within said opening, the retaining member extending across said opening, and both said further member and both ends of said retaining member being mounted to walls of said body.

* * * * *